UNITED STATES PATENT OFFICE 2,287,064

STABLE DRY COMPOSITIONS USEFUL AS BLEACHING AND OXIDIZING AGENTS

Joseph S. Reichert, Samuel A. McNeight, and Arthur A. Elston, Niagara Falls, N. Y., assignors to E. I. du Pont de Nemours & Company, Wilmington, Del., a corporation of Delaware No Drawing. Application May 1, 1940, Serial No. 332,728

11 Claims. (Cl. 252—186)

This invention relates to certain new compositions of matter having oxidizing and bleaching properties. More particularly, the invention relates to a stable, dry composition prepared by mixing an inorganic peroxygen compound and an organic acid anhydride or its equivalent, which composition does not contain sufficient available water or moisture to permit chemical reaction between the components of the mixture prior to its utilization for oxidizing or bleaching purposes.

Our invention relates more especially to the new and improved compositions secured by compounding solid peroxygen compounds such as sodium perborate monohydrate and solid organic acid anhydrides such as succinic anhydride, phthalic anhydride, benzoic anhydride, maleic anhydride, and glutaric anhydride. More generally, the invention relates to stable, dry compositions obtained by compounding a solid inorganic peroxygen compound and an organic acid anhydride, which compositions, when added to water, will yield bleaching and oxidizing solutions containing an organic monoperacid or its salt.

In the past bleaching and oxidizing compositions of high activity comprising peracids or persalts, suitable for utilization under various conditions of alkalinity or acidity, could only be produced by chemical reaction directly at the point of use. Stable, dry compositions suitable for addition to water or aqueous liquids to form bleaching and oxidizing compositions of activity greater than that of the inorganic peroxides were not available. Previous attempts to prepare for commercial use dry compositions which are stable on storage have aimed at producing mixtures which, when dissolved in water, yielded oxidizing solutions having the characteristics and bleaching activity of hydrogen peroxide. Our principal aim is the preparation of dry compositions, stable on storage, which compositions when added to water or aqueous liquids will form, not peroxides and their salts, but organic monoperacids and their salts. The organic peracids and persalts possess increased bleaching activity and exert their oxidizing effects at lower temperatures and with greater rapidity than the peroxides or inorganic percompounds.

The organic monoperacids are a class of organic acids which are produced when the hydroxyl group containing the ionizable hydrogen atom of an organic acid is replaced by the perhydroxyl group, —OOH. Thus, monopersuccinic acid having the formula

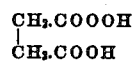

may be regarded as derived from succinic acid, having the formula

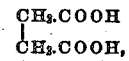

by replacement of one of the hydroxyl groups containing an ionizable hydrogen atom by the perhydroxyl group —OOH.

Our previous work with the peracids, and especially with the monoperacids, has impressed us with the fact that these acids and their salts are definitely superior to inorganic peroxide compounds such as hydrogen peroxide when employed for oxidizing or bleaching purposes. Their bleaching and oxidizing activity is greater than that of inorganic peroxides such as hydrogen peroxide and it is exerted with greater rapidity and at lower temperatures. The peracids and persalts, especially the monoperacids and monopersalts, also function over a wider range of acidity and alkalinity, and therefore may be regarded as more suited for universal application under the various conditions encountered in commercial bleaching operations.

Since solutions of the peracids and persalts are not stable when stored for any considerable period of time, it has been necessary in the past to prepare the solution by chemical reaction wherever needed. Methods available for their preparation have required careful control of reactants, careful maintenance of reaction conditions, the use of relatively high concentrations of the reacting chemical compounds, and of fairly long reaction periods. As a result the art has made little or no industrial use of these oxidizing compounds.

In our copending patent application Serial No. 317,318, filed February 5, 1940, we have described a method for the preparation of the peracids and persalts which is more readily carried out with less control of the conditions involved than are the methods previously known to the art. However, the method of our copending application nevertheless requires control of the reaction to the extent of maintaining the proper and correct proportioning of the separate reagents employed in the preparation of the peracid or persalt. Moreover, it does not result in solutions which are stable during long periods of storage, and when employing the method of our copending application it is generally necessary to prepare the solution of the peracid or the persalt at the place where its use is intended.

By providing a dry, stable mixture of inorganic peroxygen compound and organic acid anhydride or its equivalent, however, we have provided a method permitting preparation of the peracids as needed without the necessity for exercising control of the proportions of the reagents, or careful control of the reaction at the time and place at which it is desired to utilize the compositions for bleaching or oxidizing purposes. Since our compositions are dry, stable, solid mixtures which when dissolved in water or aqueous liquids readily and simply provide solutions of peracids or persalts, it is evident that carefully weighing out amounts, controlling reaction conditions within narrow limits, and providing a fairly long period of reaction are no longer necessary at the place where the peracids or persalts are to be utilized for industrial purposes.

Our improved compositions, while capable of producing the peracid or persalt as needed by simply adding the mixture to water at the place of use, nevertheless possess satisfactory stability for commercial storage and shipment. It is evident that our improved stable, dry mixtures of peroxygen compounds and acid anhydrides may be viewed, for all purposes, as a stable peracid composition, thus rendering it possible to utilize the peracids and the persalts in commercial operations conveniently and without the necessity for careful control or proportioning at the point of use.

Accordingly, one of the objects of this invention is the preparation of a stable, dry composition which composition, when dissolved in water or in aqueous solutions, will yield an active and effective oxidizing and bleaching agent. Another object of this invention may be said to be the preparation of a dry, stable composition which may be stored for indefinite periods without danger of chemical instability but which will, nevertheless, when dissolved in water yield solutions of the monoperacids or their salts, chemical compounds which in aqueous solutions exhibit marked and effective bleaching and oxidizing activity. In brief, the primary object of our invention is the preparation of a stable, dry composition which can be stored indefinitely but which is instantly available, simply by dissolving the solid mixture in water or aqueous liquids, to yield solutions of peracids or persalts. Both these objects involve developments of the utmost importance in the art of bleaching and oxidizing compounds, for never before has it been possible to prepare a dry, stable composition of a peracid or persalt which would be stable for an indefinite period and yet yield an oxidizing agent of greatly increased activity by simple dissolution in water. Nor has it ever been previously possible to prepare stable solutions of peracids or persalts, as needed, without the necessity for careful proportioning of the reagents and control of the reaction used to produce the compounds at the point where their use is intended.

In the past organic acids such as succinic acid have sometimes been incorporated in mixtures of solid percompounds such as sodium perborate. The purpose of these acids has, however, been solely to reduce the alkalinity of the solution resulting when the composition is dissolved in water. The acid employed for this purpose is one which reacts with alkali to form a solution of reduced alkalinity. As contrasted with this, the compounds that we use, the organic acid anhydrides or their equivalents, e. g. succinic anhydride, phthalic anhydride, glutaric anhydride, etc., instead of reacting with the alkali to result in a solution of lowered alkalinity, undergo perhydrolysis and react with the percompound when dissolved in water to form a peracid or salt of the peracid. Acids corresponding to the anhydrides mentioned, for example succinic acid, phthalic acid, and glutaric acid, do not undergo hydrolysis and react in aqueous solution with percompounds such as sodium perborate to form a peracid or persalt. They merely react with any alkali present to reduce the alkalinity. Accordingly, we utilize in admixture with the solid inorganic peroxygen compound such as sodium perborate, the organic acid anhydrides or their equivalents, which will hydrolyze in aqueous solution and react with the peroxygen compound to form the desired monoperacid or its salt. The ability thus to react in aqueous solution is characteristic of the organic acid anhydrides and equivalent substances.

In preparing our stable, dry compositions of matter comprising an alkaline inorganic peroxygen compound and an organic acid anhydride or its equivalent, which compositions do not contain sufficient water or moisture to permit chemical reaction between the components of the mixture before the solid product is dissolved in an aqueous liquid, we may utilize a variety of individual compounds. We prefer, however, to utilize as the inorganic alkaline peroxygen compound sodium perborate monohydrate, $NaBO_3.H_2O$. As organic acid anhydrides we may utilize a large variety of such anhydrides, but generally because of their ready availability and somewhat lower cost, we prefer to use such organic acid anhydrides as succinic anhydride, maleic anhydride, phthalic anhydride, benzoic anhydride, and glutaric anhydride. Generally the non-toxic organic acid anhydrides are desirable for use in our composition, but in some cases, of course, anhydrides of toxicity of a greater or less degree may be utilized. While sodium perborate monohydrate is our preferred solid inorganic peroxygen compound, by reason of its low cost and availability, we of course are not limited to this compound, but may utilize other solid peroxygen compounds such as other perborates; alkali metal, alkaline earth metal and other peroxides; metal percarbonates, persulfates, perphosphates, etc. These peroxygen compounds may be either anhydrous or in the hydrated state as long as they do not contain sufficient free or uncombined water to interfere with the obtainment of a dry mixture. Among suitable peroxygen compounds are urea peroxide, zinc peroxide, magnesium peroxide, calcium peroxide and the perphosphates having the compositions $Na_4P_2O_7.2H_2O$ and $Na_2HPO_4.2H_2O$.

The ratio of the amount of inorganic peroxygen compound to the amount of organic acid anhydride or equivalent in the composition will be controlled by the extent to which it is desired to have either one or both of these substances converted to the organic peracid or its salt. Generally we prefer to use compositions containing equimolar amounts of the peroxygen compound such as sodium perborate monohydrate, and the acid anhydride. This means that the ratio of the amount of the peroxygen compound to the amount of anhydride is the same as the ratio of the molecular weights of these two compounds.

These mixtures, when dissolved in water or aqueous liquids, will generally react to give greater yields of the peracid or its salt per unit weight of the dry solid composition.

However, it is possible to control the acidity and alkalinity of the aqueous solution of the peracid or persalt by controlling the ratio of the amount of inorganic peroxygen compound present in the mixture to the amount of acid anhydride. In many cases, of course, it may be more desirable to obtain this same control of the pH of the aqueous solution by other means, in which case ordinarily equimolar amounts of the peroxygen compound and acid anhydride would be utilized. However, compositions containing other than equimolar proportions of the two chief components are also useful. A composition containing a stoichiometric excess of one component over the other may be particularly suitable for some industrial or commercial purposes. We have, for example, prepared mixtures containing from 40 mole percent to 83 mole percent of sodium perborate monohydrate and have utilized these compositions to prepare the peracid or its salt in aqueous solution, which solution is particularly useful for bleaching and oxidizing purposes.

In addition to the inorganic peroxygen compound and the organic acid anhydride in the dry composition, there may also be present other components which serve to modify the properties of the peracid solutions obtained when the dry composition is dissolved in water. Thus, the alkalinity or acidity of the resulting peracid or persalt solution can be modified independently of the ratio of amounts of peroxygen compound and anhydride by incorporating various amounts of an alkaline or acid material in the dry composition. Alkalizing agents such as anhydrous sodium carbonate, tetrasodium pyrophosphate, or similar compounds may be included in the composition. Other desirable qualities may be imparted to the resulting peracid or persalt solutions obtained by including in the composition substances such as anhydrous soaps, perfumes, and flavoring materials which are not reacted upon and are compatible with the two main components.

Preparation of the peracid solutions or solutions of the salts corresponding to the peracids is readily carried out simply by adding the dry, stable composition to the desired quantity of water. The solution is agitated for a suitable time, usually but a few minutes are necessary, in order to insure complete solution of the material. The dry, stable composition here described is particularly suitable for the preparation of peracid solutions in accordance with the improved process disclosed in our previously referred to copending application.

By the use of our dry, stable compositions for preparing solutions of peracids and persalts the loss of the oxidizing and bleaching properties of the composition due to decomposition during storage is negligible as far as its effectiveness for its intended uses is concerned. Moreover, the composition can be commercially stored and shipped without danger of decomposition and in ordinary packages, as it does not require special containers or shipping means. The proper proportioning of the material in preparing solutions of peracids or persalts is automatically maintained when the initial dry composition is prepared, thus rendering unnecessary any special proportioning or careful control at the point of use when preparing solutions for use as oxidizing or bleaching agents.

It is apparent that we have provided means for utilizing the rapid and powerful bleaching and oxidizing properties of the organic peracids and their salts for industrial purposes without the necessity for special control or careful reaction of the materials at the point where it is desired to employ the products for commercial purposes. It is also evident that we have produced a stable, dry composition which, when dissolved in water, without the necessity for special adjustments of any condition or factor, produces an active oxygen-yielding bleaching and oxidizing composition suitable for immediate utilization for industrial purposes.

As examples of our dry, stable compositions containing an inorganic peroxygen compound and an organic acid anhydride, the following may be given. These examples demonstrate the very stable character of our improved compositions even after storage for fairly long storage periods. It may be noted that the concentration of an active oxygen-yielding compound in a solution thereof is frequently given in terms of its volume concentration. The volume concentration of such a solution is the number of cubic centimeters of oxygen gas, measured at 0° C. and 760 millimeters of mercury pressure, which is released by one cubic centimeter of the solution at 20° C. Thus commercial solutions of hydrogen peroxide, such as those sold under the trade-mark "Albone," are of 100 volume concentration or yield 100 cubic centimeters of oxygen gas per cubic centimeter of solution. This corresponds to an $H_2O_2$ content of 27.6% by weight.

*Example 1*

Various samples were compounded utilizing 5 grams (approximately 0.05 mol) of succinic anhydride and 5 grams (approximately 0.05 mol) of sodium perborate monohydrate. The sodium perborate monohydrate had an active oxygen content of 15.41% by weight. The samples, after preparation, were placed in small bottles, closed by stoppers containing a glass capillary tube as a vent. All samples were stored in a cabinet thermostatically maintained at 32° C. for periods of time ranging from three weeks to four months. At the end of these periods they were analyzed for loss in active oxygen content, duplicate samples being analyzed. Each sample originally contained 0.772 grams (7.72%) of active oxygen. The active oxygen contents of the samples after the various storage periods are given in the following table.

| Storage period | Active oxygen content | | Percent of active oxygen loss | |
|---|---|---|---|---|
| | Sample #1 | Sample #2 | Sample #1 | Sample #2 |
| | Grams | Grams | Per cent | Per cent |
| At the start | 0.772 | 0.772 | | |
| 3 weeks | 0.71 | 0.71 | 8.03 | 8.03 |
| 9 weeks | 0.68 | 0.68 | 11.65 | 11.6 |
| 4 months | 0.65 | 0.66 | 15.3 | 14.5 |

All samples when dissolved in water yielded monopersuccinic acid. The solutions were very active bleaching and oxidizing agents.

*Example 2*

A dry, solid bleaching and oxidizing composition was prepared by mixing 5 grams of succinic anhydride and 5 grams of sodium perborate monohydrate of active oxygen content 15.74% by weight. The sodium perborate monohydrate was prepared by subjecting material of higher moisture content to drying in a vacuum at a temperature of 80 to 90° C.

The 10 gram sample contained 0.785 gram of active oxygen, as prepared. After one month's storage its active oxygen content was 0.756 gram, representing an active oxygen loss of 3.7%. When dissolved in water, there resulted an oxidizing and bleaching bath of great activity.

Example 3

Various 10 gram samples were compounded by mixing sodium perborate monohydrate, succinic anhydride, and tetrasodium pyrophosphate. These samples had various amounts of the three ingredients, indicated in the following table.

After preparation the active oxygen content of the dry compositions was determined. The compositions were then stored for two weeks at 32° C. and again analyzed to determine their active oxygen content.

|  | Composition A | Composition B | Composition C |
|---|---|---|---|
| Sodium perborate monohydrate percent | 10 | 25 | 40 |
| Succinic anhydride do | 10 | 25 | 50 |
| Anhydrous tetrasodium pyrophosphate percent | 80 | 50 | 20 |
| Original active oxygen content grams | 0.146 | 0.368 | 0.584 |
| Active oxygen content after storage for two weeks grams | 0.141 | 0.346 | 0.552 |
| Percent active oxygen loss | 3.42 | 5.98 | 5.48 |

The compositions when dissolved in aqueous liquids yielded very active bleaching and oxidizing compositions.

Example 4

10-gram samples of a dry, solid composition were compounded from sodium perborate monohydrate, succinic anhydride, and sodium carbonate. The samples had the composition indicated in the following tabulation. After preparation the active oxygen content of each sample was determined. The samples were then stored for 3½ weeks and again analyzed to determine their active oxygen content and active oxygen loss. The results are summarized in the following table:

|  | Composition A | Composition B |
|---|---|---|
| Sodium perborate monohydrate percent | 45 | 30 |
| Succinic anhydride do | 45 | 30 |
| Anhydrous sodium carbonate do | 10 | 40 |
| Original active oxygen content grams | 0.689 | 0.453 |
| Active oxygen content after 3½ weeks storage do | 0.623 | 0.416 |
| Percent active oxygen loss in 3½ weeks | 9.58 | 8.16 |

The compositions when dissolved in water yielded very active bleaching and oxidizing baths.

Example 5

Somples containing sodium perborate monohydrate and succinic anhydride having the compositions indicated in the following tabulation were prepared. Solutions were prepared from each sample, utilizing water at 90° F. and sufficient material to give an active oxygen concentration of 0.025 volume. The pH of the solution and the extent of conversion of the perborate and the anhydride were determined in each case. The results are tabulated below.

| Composition, percent by weight | | Average pH of solution | Percent conversion to peracid | |
|---|---|---|---|---|
| $NaBO_3.H_2O$ | $C_4H_4O_3$ | | $NaBO_3.H_2O$ | $C_4H_4O_3$ |
| 83.2 | 16.8 | 9.2 | 14.3 | 71.5 |
| 66.7 | 33.3 | 8.0 | 44.8 | 89.6 |
| 55.5 | 44.5 | 6.5 | 66.8 | 80.5 |
| 52.9 | 47.1 | 5.8 | 65.9 | 73.4 |
| 50.0 | 50.0 | 5.2 | 72.6 | 72.6 |
| 47.4 | 52.6 | 4.9 | 71.8 | 65.3 |
| 45.5 | 54.5 | 4.8 | 71.3 | 60.5 |
| 40.0 | 60.0 | 4.5 | 66.8 | 44.6 |

Example 6

Anhydrous sodium carbonate in the various amounts indicated in the tabulation below was added to various portions weighing 0.92 gram of a composition compounded of equimolar amounts (equal parts by weight) of sodium perborate monohydrate and succinic anhydride. These samples were each dissolved in 2 litres of water at 120° F., after which the solutions were analyzed to determine pH and percent conversion of the sodium perborate monohydrate to the peracid. The results are given in the following table.

| Amount of $Na_2CO_3$ used per 0.92 g. of $NaBO_3.H_2O$-$C_4H_4O_3$ mixture | Average pH of solution | Percent conversion of $NaBO_3.H_2O$ to peracid |
|---|---|---|
| 0.10 g | 6.6 | 80.4 |
| 0.25 g | 7.5 | 79.9 |
| 0.65 g | 9.0 | 81.2 |
| 3.25 g | 10.4 | 66.8 |

Example 7

The procedure of Example 6 was followed, utilizing anhydrous tetrasodium pyrophosphate in place of the sodium carbonate utilized in that example. The pH of the solution was determined in each case, as well as the percent conversion of sodium perborate monohydrate to the peracid. The results are given in the following table:

| Amount of $Na_4P_2O_7$ used per 0.92 g. of $NaBO_3.H_2O$-$C_4H_4O_3$ composition | pH of solution | Percent conversion of $NaBO_3.H_2O$ to peracid |
|---|---|---|
| 0.10 g | 5.5 | 76.6 |
| 0.25 g | 6.1 | 77.7 |
| 0.65 g | 7.4 | 77.2 |
| 3.25 g | 8.9 | 72.3 |

Example 8

The procedure of Example 6 was followed, utilizing, however, in place of the sodium carbonate there employed, ordinary pure soap. In each case the pH of the resulting solution was measured and the percent conversion of sodium perborate monohydrate to monopersuccinic acid determined. The resulting solution was in each case a very effective oxidizing and bleaching agent. The results are tabulated below:

| Amount of soap used per 0.92 g. of $NaBO_3.H_2O$-$C_4H_4O_3$ composition | pH of solution | Percent conversion of $NaBO_3.H_2O$ to peracid |
|---|---|---|
| 0.52 g | 6.5 | 79.8 |
| 1.8 g | 8.9 | 83.3 |
| 6.0 g | 9.0 | 81.6 |

Example 9

A composition was prepared utilizing equimolar amounts (amounts of equal weight) of sodium perborate monohydrate and succinic anhydride. Various amounts of the resulting composition, which amounts are given in the table below, were dissolved in water at 90° F. The resulting solution, which was an active bleaching and oxidizing solution, was analyzed to determine its pH and the percent conversion of the sodium perborate monohydrate to peracid. The results are as follows:

| Grams of composition per litre of water | pH of solution | Percent conversion of perborate to peracid |
|---|---|---|
| 0.92 | 5.0 | 72.6 |
| 9.2 | 5.2 | 84.4 |
| 36.8 | 5.3 | 72.3 |

Example 10

A dry, solid composition was prepared by mixing equimolar amounts of sodium perborate monohydrate and glutaric anhydride. Equimolar amounts of these compounds are equivalent to 1.0 gram of the sodium perborate monohydrate and 1.14 grams of the organic acid anhydride. The resulting composition was stored at 32° C. for various periods of time and its active oxygen content determined at the end of the storage periods. The active oxygen content and the percent of active oxygen loss are given below:

| Active oxygen content | Sample 1 | Sample 2 |
|---|---|---|
|  | Grams | Grams |
| Originally | 0.154 | 0.154 |
| After storage for 15 weeks | 0.138 | 0.137 |
| After storage for 31 weeks | 0.127 | 0.128 |

| Percent active oxygen loss | Sample 1 | Sample 2 |
|---|---|---|
|  | Percent | Percent |
| On storage for 15 weeks | 10.28 | 10.8 |
| On storage for 31 weeks | 17.5 | 16.9 |

Example 11

An equimolar composition of sodium perborate monohydrate and phthalic anhydride was prepared. Two samples of approximately 100 grams each were taken and stored at 32° C. for various periods of time. At the end of three-week and two-month intervals the samples were analyzed to determine the percentage of active oxygen loss. The values are given below.

|  | Sample 1 | Sample 2 |
|---|---|---|
|  | Percent | Percent |
| Percent active oxygen loss in 3 weeks | 4.02 | 2.2 |
| Percent active oxygen loss in 2 months | 17.7 | 18.3 |

It will be noted that the compositions are relatively stable, even after fairly long storage periods. When dissolved in water, bleaching baths of activity considerably greater than that of sodium perborate alone or hydrogen peroxide were secured.

Example 12

The procedure described in Example 11 was followed, employing, however, a mixture comprising 1 part of sodium perborate monohydrate, 1.48 parts of phthalic anhydride, and 1.71 parts of anhydrous sodium carbonate, all parts being by weight. This composition when dissolved in water gave a very active bleaching and oxidizing bath.

The dry composition was stored for three weeks and two months, and at the end of these periods the percent of active oxygen loss determined. These values are given below. It is evident that the composition is very stable on storage even for fairly long periods of time.

|  | Sample 1 | Sample 2 |
|---|---|---|
|  | Percent | Percent |
| Percent active oxygen loss in 3 weeks | 3.45 | 3.72 |
| Percent active oxygen loss in 2 months | 7.5 | 9.5 |

Example 13

A composition was prepared by mixing equimolar amounts of sodium perborate monohydrate and phthalic anhydride. This composition was dissolved in sufficient water at 120° F. to yield a solution of approximately 0.0125 volume concentration. The sample was completely dissolved within five minutes and 50% of the active oxygen present in the sample was found to be in the form of the peracid, i. e. monoperphthalic acid.

Example 14

Sample compositions A and B were prepared as follows: A consisted of 0.92 gram of sodium perborate monohydrate and 0.92 gram of succinic anhydride. B consisted of 0.92 gram of sodium perborate monohydrate and 1.09 grams of succinic acid.

Both dry compositions, A and B, were dissolved in four litres of water at 120° F. to form two solutions. In the solution prepared from the perborate-succinic anhydride mixture, it was determined that 73.4% of the active oxygen originally present in the perborate was present in the solution in the form of the peracid, i. e., monopersuccinic acid. No peracid whatever could be detected in the solution prepared by dissolving the mixture of succinic acid and sodium perborate monohydrate in the four litres of water.

It should be understood that various changes may be made in the proportions, ingredients, and amounts which have been given as illustrative of preferred embodiments of our invention. Thus, various changes might be made by incorporating additional ingredients, or by varying their proportions, which modified compositions would still fall within the scope of our invention. Accordingly, the scope of our invention is not to be restricted to details given as illustrative of preferred compositions, but is to be interpreted in accordance with the prior art and appended claims.

We claim:

1. A dry, stable composition which yields in aqueous solution an oxidizing agent of high activity, said composition comprising a solid inorganic peroxygen compound and an organic acid anhydride.

2. A stable composition, suitable for yielding oxidizing solutions on solution in water, which composition comprises a solid peroxygen compound and an organic acid anhydride, said composition containing less than sufficient available moisture to permit chemical reaction upon standing during storage.

3. A dry, stable composition, yielding an oxidizing solution when dissolved in water, which composition comprises a solid peroxygen compound selected from the group which consists of sodium perborate, sodium peroxide, sodium percarbonate, and sodium perphosphates, and an organic acid anhydride.

4. A dry, stable composition which when dissolved in water yields an oxidizing solution, comprising sodium perborate monohydrate and an organic acid anhydride.

5. A dry, stable composition which, on dissolution in water yields an active oxygen-yielding solution, said composition comprising sodium perborate monohydrate and an organic acid anhydride selected from the group which consists of phthalic anhydride, succinic anhydride, maleic anhydride, benzoic anhydride, and glutaric anhydride.

6. A dry, stable composition comprising sodium perborate monohydrate and succinic acid anhydride.

7. A dry, stable composition comprising sodium perborate monohydrate and phthalic acid anhydride.

8. A dry, stable composition comprising sodium perborate monohydrate and glutaric acid anhydride.

9. A dry, stable composition comprising a solid peroxygen compound, an organic acid anhydride, and a material for regulating the pH of the solution resulting when said composition is dissolved in water to provide an active oxygen-yielding solution of high activity.

10. A dry, stable composition comprising a solid peroxygen compound, an organic acid anhydride, and a material for controlling the pH of the resulting solution selected from the group which consists of anhydrous sodium carbonate, tetrasodium phosphate, and soap.

11. A dry, stable composition comprising sodium perborate monohydrate, an organic acid anhydride selected from the group which consists of succinic anhydride, phthalic anhydride, maleic anhydride, benzoic anhydride and glutaric anhydride, and an alkalizing agent for adjusting the pH of the solution resulting when the composition is dissolved in an aqueous liquid.

JOSEPH S. REICHERT.
SAMUEL A. McNEIGHT.
ARTHUR A. ELSTON.